(No Model.)
W. BOWER.
LEMONADE STRAINER.
No. 248,843. Patented Nov. 1, 1881.
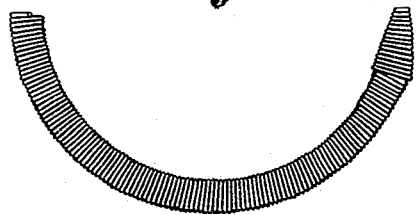
Fig. 1.
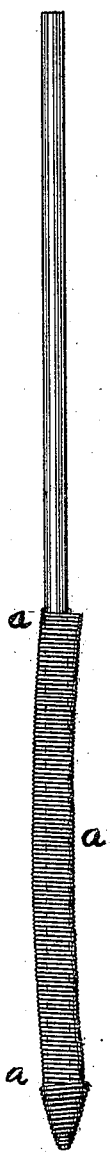
Fig. 2.
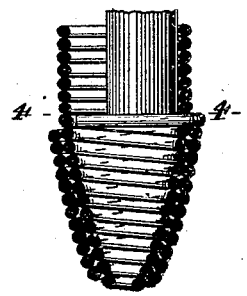
Fig. 3.
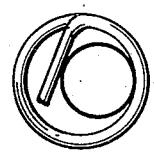
Fig. 7.
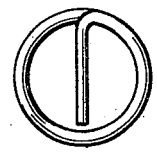
Fig. 5.
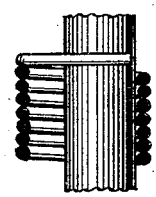
Fig. 6.
Fig. 4.
Attest:
Adolph Ernst Stamm.
William Clarence White.
Inventor:
William Bower.

UNITED STATES PATENT OFFICE.

WILLIAM BOWER, OF OLNEY, ILLINOIS.

LEMONADE-STRAINER.

SPECIFICATION forming part of Letters Patent No. 248,843, dated November 1, 1881.

Application filed September 6, 1881. (No model.)

*To all whom it may concern:*

Be it known that I, WILLIAM BOWER, a citizen of the United States, residing at Olney, in the county of Richland and State of Illinois, have invented a new and useful implement designed to be used as a strainer for lemonade and all drinks or beverages dispensed with a straw or other tube, of which the following is a specification.

My invention is an implement for dispensing lemonade or other beverages containing fibrous, pulpy, or solid matter when it is desired to dispense them by the use of a straw or tube.

The object of my invention is—

First. To provide by means of a loosely-wound coil made in whole or in part of metal, rubber, or celluloid, round, flat, oval, or other-shaped wire, wound so as to close one end, the straw or tube to be inserted in the other end, the device to form a strainer which will prevent the fibrous, pulpy, or other solid matter from filling the opening in the straw or tube. Thus the time, labor, and annoyance of the usual way of straining lemonade or other beverages containing solid matter is obviated and waste of straws prevented. The use of the strainer permits lemonade or other beverages to be dispensed as it is made with the solid portions of the fruits from which it is made in it, making it more attractive to the customer.

Second. At a point about one-fourth inch from the closed end of the strainer or coil a wire is placed across the diameter of the strainer, which prevents the straw or tube from resting on the bottom of the strainer, thus preventing the straw or tube from being closed up by contact with the bottom of the strainer.

Third. At the open end of the strainer or coil a wire is formed across the diameter of the strainer. This wire, being a continuation of the wire forming the coil or strainer, makes it a sensitive spring, which adapts itself to different-sized straws and tubes. The pressure of this spring or wire against the straw or tube prevents the strainer from falling off when in use.

Fourth. The strainer or coil being in the form of a half-circle or other curve when the straw or tube is inserted, produces a pressure on the sides of the straw or tube, securing additional protection against the strainer falling off of the straw or tube during use.

Fifth. The strainer being flexible renders it easily cleansed. By simply shaking it under water the wires of the coil separate, the fibrous or pulpy substance is liberated and easily rinsed off.

The following is a description of the drawings:

Figure 1 represents the flexible-coil lemonade-strainer complete. Fig. 2 represents the same implement with a straw inserted therein ready for use. Fig. 3 represents a sectional view of the lower end of the coil, showing the end of the wire at 4 4 crossing the diameter of the coil, forming a rest for the lower end of the straw. Fig. 4 represents the lower end of the wire crossing the diameter of the coil, being the same end represented at 4 4 in Fig. 3. The dotted circle in Fig. 4 represents the lower end of the straw. Fig. 5 shows the upper end of the wire bent across the tubular opening of the coil, so as to form a spring for holding the straw in place. Fig. 6 is a sectional view of the upper end of the coil, showing straw inserted behind the spring formed by the upper end of the wire, the spring pressing the straw against the side of the coil. Fig. 7 shows the manner in which the spring presses against the straw, the inner circle representing the straw.

I attain the objects set forth in these specifications by the mechanism illustrated in the accompanying drawings, a detailed description of which is as follows:

Fig. 1 shows the coil, formed in whole or in part of metal, rubber, or celluloid wire, either round, flat, oval, or other shaped, with one closed end, the other end open for inserting a straw or tube. The entire contrivance is formed of one wire wound with sufficient space between the wires of the coil to admit liquids freely. The space required is about the thirty-second part of an inch. This leaves the wires close enough together to exclude from inside the strainer or coil solid substances which could fill up the opening in the straw or tube. The diameter of the strainer or coil should be sufficiently large to admit an ordinary rye-straw and leave a space between the straw and strainer of about one-sixteenth of an inch, so as to admit to the straw or tube a free flow of liquids. The length of the strainer or coil should be not less than two inches, so as to furnish sufficient straining-surface to supply the liquid to the straw or tube freely and sufficiently rapidly. The shape of the strainer, as shown by Fig. 1, is a half-circle, or it may be any other convenient curve. When the straw or tube is inserted in the coil, as shown by Fig. 2, the strainer is straightened. The pressure of the strainer on the straw or tube at points a a a, Fig. 2, fastens the strainer to the straw or tube while in use.

Fig. 3 shows the manner of forming the closed end of the strainer. This is done by winding the wire from the body of the strainer tapering to a point, as shown by Fig. 3. Then the wire is wound back over the first coil of the tapered point (see Fig. 3) until it covers the tapered part of the strainer, stopping at 4 4, Fig. 3. The wire is then drawn through the center of the diameter of the strainer 4 4, Fig. 3, and also shown by Fig. 4. The purpose of passing the wire through the diameter of strainer, as shown at 4 4, Figs. 3 and 4, is to form a rest for the straw or tube (see dotted lines, Fig. 4) when inserted, preventing the straw or tube from going to the bottom of the strainer, and thereby closing the opening in the straw or tube. The open end of the strainer through which the straw or tube is inserted is constructed by forming the end of the wire from which the body of the strainer is made directly across the diameter of the strainer, as shown by Fig. 5. This wire, being a continuation of the body of the strainer, forms a spring. When the straw or tube is inserted the spring is forced aside, as shown by Fig. 7. The pressure of the spring and the wire of the body of the strainer on the straw or tube, as shown in Fig. 6, fastens the strainer to the straw or tube and holds it in place during use and until it is forcibly removed.

What I claim as my invention, and desire to secure by Letters Patent, is—

1. A flexible coil strainer with one closed end for applying to a straw or tube, all as substantially set forth, and for the purposes specified, illustrated by Fig. 1.

2. Wire running across or partly across the diameter of the strainer, near the closed end at 4 4, Fig. 3, and also illustrated by Fig. 4, for the purposes set forth, substantially as described.

3. The spring formed across the diameter at open end of strainer, as shown by Figs. 5, 6, and 7, for the purposes set forth in these specifications, all substantially as described.

4. The half circle (or other conveniently curved) shape of the entire strainer, as shown in Fig. 1, and its purposes illustrated in Fig. 2, for the purposes specified, all as substantially set forth.

WILLIAM BOWER.

Attest:
ADOLPH ERNST STAMM,
WILLIAM CLARENCE WHITE.